(12) United States Patent
Chan et al.

(10) Patent No.: US 8,332,562 B2
(45) Date of Patent: Dec. 11, 2012

(54) SYSTEM TO REDUCE THE TIME AND COMPLEXITY OF SELF CONFIGURING SYSTEMS

(75) Inventors: Hoi Y. Chan, Hawthorne, NY (US);
Jeffrey O. Kephart, Hawthorne, NY (US); David W. Levine, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 567 days.

(21) Appl. No.: 12/562,540

(22) Filed: Sep. 18, 2009

(65) Prior Publication Data

US 2011/0072316 A1    Mar. 24, 2011

(51) Int. Cl.
*G06F 13/00*    (2006.01)
(52) U.S. Cl. .................. 710/304; 710/305; 713/300
(58) Field of Classification Search .......... 710/300–306; 713/300–340
See application file for complete search history.

(56) References Cited

U.S. PATENT DOCUMENTS

| 5,555,401 | A | 9/1996 | Allen et al. |
| 6,138,194 | A * | 10/2000 | Klein et al. .................. 710/302 |
| 6,397,268 | B1 * | 5/2002 | Cepulis ............................ 710/8 |
| 6,838,852 | B1 | 1/2005 | Namuduri |
| 7,155,254 | B2 | 12/2006 | Pinder |

* cited by examiner

*Primary Examiner* — Brian Misiura
*Assistant Examiner* — Kim Huynh
(74) *Attorney, Agent, or Firm* — Scully, Scott, Murphy & Presser, P.C.; Daniel P. Morris, Esq.

(57) ABSTRACT

A system and method for testing a self configuring computer which includes a computer system. Sensors electrically communicating with respective electrical connectors in the computer system. The sensors detecting when the electrical connector has a change of status from a previous start up. The sensor indicating a state change when the connector has a change of status. The computer system electrically communicating with the sensor for detecting the sensor state. The computer system initiating a power up and a self test of the connector and a new device connected to the connector using the program upon start up of the computer system when a change in the state of the sensor indicates a change in the status of the connector. The computer system by-passing a power up and self test of the connector when there is no change in the state of the sensor.

16 Claims, 3 Drawing Sheets

SYSTEM TO REDUCE THE TIME AND COMPLEXITY OF SELF CONFIGURING SYSTEMS

FIELD OF THE INVENTION

The present invention relates to a system and a method for testing self configuring computer systems, and more particularly, a system and method for testing and/or self configuring on startup a self configuring computer system.

BACKGROUND

Current computer systems, for example, server/infrastructural systems require a substantial amount of time to complete power on self testing (POST) and related or similar testing or self configuration activities. POST testing is used to ensure stable operation of a computer system, for example, by ensuring that resource or subsystems are functioning properly. Typically, the POST is part of a self-configuration task of determining what resources are currently installed in the system, and ensuring they are properly started and configured. A significant portion of POST activities are inherently time consuming, for example, each potential device location must be sent a wakeup signal, be given time to wake up, and then tested to see if there is, in fact, a device at that location. This may not be a significant burden on a system which performs power on infrequently, however, it is a significant burden on systems which are powered on frequently by at least being time consuming. Sample systems may include server farms wherein computer systems support increasing demand, especially while balancing power consumption levels by, for example, powering down when system resource are not being accessed.

It would therefore be desirable to provide a method and system to reduce the resources expended for testing or self configuration in self configuring computer systems, e.g., reducing the time spent or time computer systems allocate for POST and other self configuration testing.

BRIEF SUMMARY

In an aspect of the invention, a system for testing a self configuring computer includes a computer system including a computer readable medium having a program embodied thereon and a processor for executing the program. A plurality of electrical connectors in the computer system connect electrical components to the computer system. At least one sensor electrically communicates with an electrical connector in the computer system. The sensor detects and has a change of state when the electrical connector has a change of status from a previous start up. The computer system electrically communicates with the sensor for detecting the sensor state. The computer system initiates a power up and a self test of the connector and a new device connected to the connector using the program upon start up of the computer system when a change in the state of the sensor indicates a change in the status of the connector. The computer system by-passes a power up and self test of the connector when there is no change in the state of the sensor. In an alternative embodiment of the invention a plurality of sensors are positioned on a plurality of respective connectors. In a related aspect a plurality of sensors are electrically communicating with respective electrical connectors in the computer system, the sensors detect when the electrical connector has a change of status and a consistent status from a previous start up. The sensors indicate a state representative of the status of the electrical connector. The state of the sensors indicates when the change of status and the consistent status of the electrical connector occur. The computer system electrically communicates with the sensors for detecting the state of the sensors. The computer system initiates a power up and a self test of a new device connected to the connector using the program upon start up of the computer system when a change in the state of the sensors indicate a change from no device connected to their respective connectors to the new device connected to their respective connectors. The computer system by-passes a power up and self test at connectors when the change in the state of their respective sensors indicates no device is connected to the connectors or there is no change in the state of the sensors from the previous start up of the computer system. In another related aspect, the previous start up is the most recent previous start up.

In another aspect of the present invention, a method for testing a self configuring computer comprises: providing a computer system including a computer readable medium having a program embodied thereon and a processor for executing the program; electrically connecting at least one sensor to at least one electrical connector in the computer system; powering on the computer system; detecting a change of state by the sensor from a previous start up using the program, the sensor change of state indicating a change of status of the connector; initiating a power up and a self test of the connector and a new device connected to the connector upon detecting a state change of a sensor at a respective connector; and by-passing a power up and a self test of a connector when there is no change in the state of a respective sensor. In a related aspect, a plurality of sensors are connected to a plurality of respective electrical connectors. In another related aspect, the method comprises: detecting when the electrical connectors have a change of status and a consistent status from a previous start up, and the sensors indicating a state representative of the status of the electrical connector; indicating, using the state of the sensors, when the change of status and the consistent status of the electrical connectors occur, the computer system electrically communicating with the sensors for detecting the state of the sensors; initiating a power up and a self test, using the computer system, of a new device connected to the connector using the program upon start up of the computer system when a change in the state of the sensors indicate a change from no device connected to their respective connectors to the new device connected to their respective connectors; and by-passing a power up and self test at connectors when the change in the state of their respective sensors indicates no device is connected to the connectors or there is no change in the state of the sensors from the previous start up of the computer system. In a related aspect, the previous start up is the most recent previous start up.

In another aspect of the invention, a computer program product comprises a computer readable medium having recorded thereon a computer program. A computer system includes electrically connected sensors positioned on device connectors and the computer system includes a processor for executing the steps of the computer program for generating a power on system test (POST), the program steps comprising: detecting a change of state by the sensor from a previous start up, the sensor change of state indicating a change of status of the connector; initiating a power up and a self test of the connector and a new device connected to the connector upon detecting a state change of a sensor at a respective connector; and by-passing a power up and a self test of a connector when there is no change in the state of a respective sensor.

In another aspect of the invention, a computer system comprises a computer readable medium having a program embodied thereon and a processor for executing the program. A plurality of electrical connectors in the computer system for connecting electrical components to the computer system. At least one sensor electrically communicates with an electrical connector in the computer system. The sensor detects and has a change of state when the electrical connector has a change of status from a previous start up. The computer system electrically communicates with the sensor for detecting the sensor state. The computer system initiates a power up and a self test of the connector and a new device connected to the connector using the program upon start up of the computer system when a change in the state of the sensor indicates a change in the status of the connector. The computer system by-passes a power up and self test of the connector when there is no change in the state of the sensor.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings, in which.

DETAILED DESCRIPTION

Figure 1:
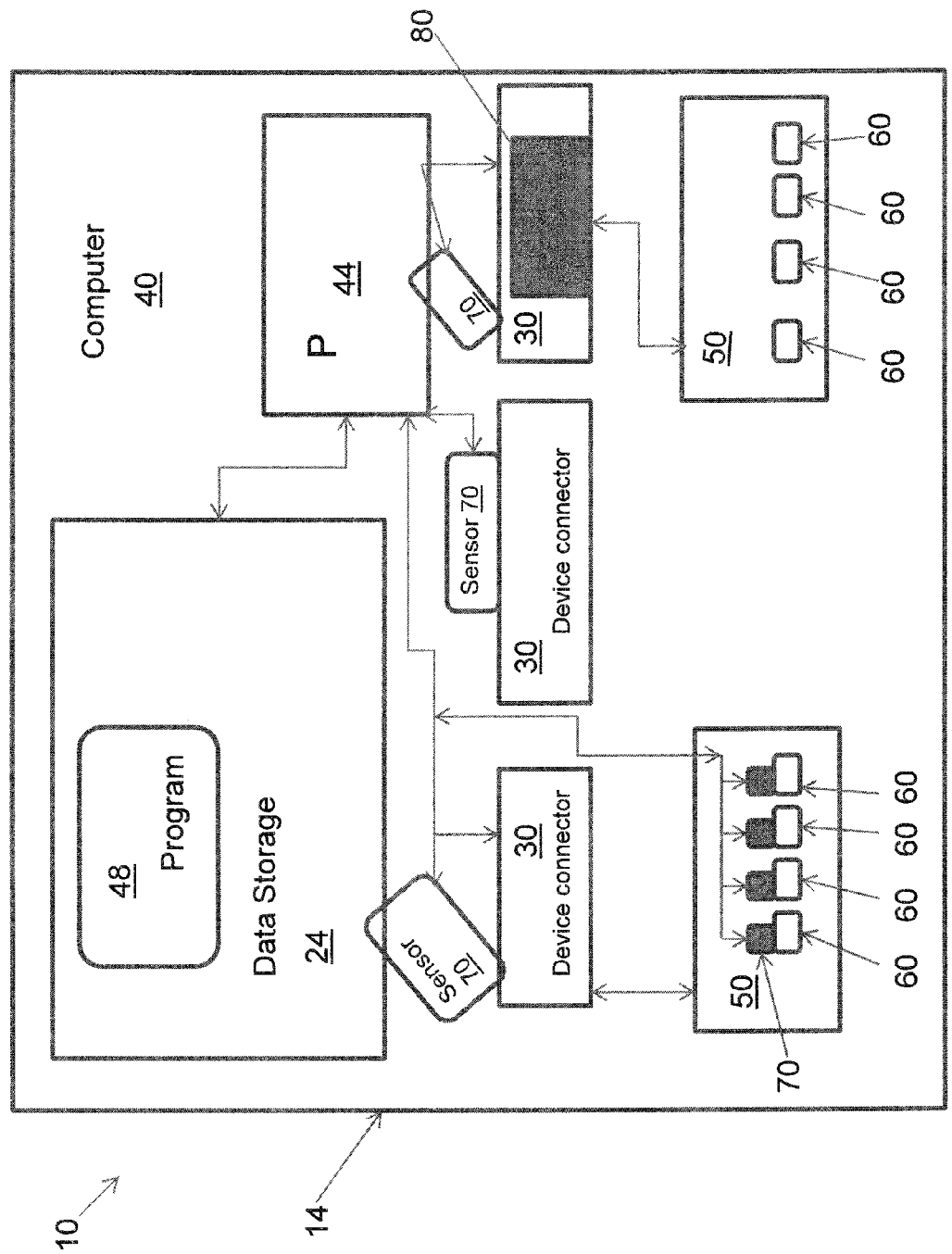
FIG. 1 is a schematic block diagram of an illustrative embodiment of a system for reducing time allocation for configuration testing (e.g., POST) in a self configuring computer system according to an embodiment of the present invention using sensors.

In an illustrative embodiment of the present invention, referring to FIG. 1, a method and system 10 is provided for configuring or testing computer systems, e.g., power on self test (POST) in a self configuring computer system. The computer system includes, for example, servers, and server farms having a plurality of computers and computer components and accessories. In the exemplary system 10 shown in FIG. 1, a computer system 14 includes a data storage device 24 storing a computer program 48. The program 48 and data storage 24 communicate with a processor 44. The processor 44 is connected to several device connectors or connectors 30. The connectors 30 may be, for example, memory slots or connectors used in server farms for adding components. The connectors 30 are further connected to devices 50 with connectors 60, for example, in a chain of devices. These devices 50 can be inside the computer system or outer peripheral devices, such as printers, or external hard drives, all of which have connectors for components. The computer system 14 provides data input and output to other devices, such as, peripheral devices, for example, memory devices, such as memory cards, flash memory, external or internal hard drives, or a plurality of network devices, such as printers. Further, other computer devices (not shown) can interact and communicate with the connectors 30, 60, for example, providing data communication. Another device 80 is plugged into connector 30. Device 80 does not include additional connectors.

The computer system 14 may carry out a method according to an embodiment of the invention. The processing unit or processor 44 may include the processor, memory and other systems components (not shown expressly in the drawing) that implement a general purpose processing system, or computer that may execute a computer program product. The computer program product may comprise media, for example a compact storage medium such as a compact disc, which may be read by the processing unit 44 through a disc drive, or by any means known to the skilled artisan for providing the computer program product to the general purpose processing system for execution thereby.

A computer program product may comprise all the respective features enabling the implementation of the inventive method described herein, and which—when loaded in a computer system—is able to carry out the method. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer program product may be stored on hard disk drives, for example, within the computer 14, or may be located on a remote system such as a server, coupled to the computer 14, via a network interface such as an Ethernet interface. For example, a monitor, mouse and keyboard (not shown) may be coupled to the computer 14, to provide user interaction. Further, for instance, a scanner and printer (not shown) may be provided for document input and output. The printer may be coupled to the computer 14 via a network connection, but may be coupled directly to the processing unit. The scanner may be coupled to the computer 14 directly, however, it is understood that peripherals might be network coupled, or directly coupled without affecting the ability of the computer to perform the method of the invention.

The computer 14 may include a variety of computer readable media. Computer readable media can be any available media that can be accessed by the computer 14 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by the computer 14.

During a power on, the device 80, the devices 50 with connectors 60, and connectors 30, in the computer system 14 are tested in a self configuration test or power on self test (POST). Other devices may also be started or woke up, powered up and tested. The device 80 is representative of devices that may be plugged in or connected to the connectors 30. In the embodiment of the invention depicted in FIG. 1, the processor 44 executes the program 48 for conducting the POST. A plurality of sensors 70 are attached to one or more connectors 30, 60. The sensors 70 may be connected to the first connector 30 in a chain of connectors or to several connectors to all the connectors 30, 60. The sensors 70 in the embodiment shown in FIG. 1, communicate with the connectors 30, 60 in the computer system 14. When a device is connected to a connector 30, the sensor 70 is removed or reposition, and is shown tilted to indicate that it is electrically removed from the connector 30.

The sensors 70 detect when the connectors 30, 60 have a change of status. The sensors 70 indicate a state change, e.g., binary 1 or 0, 1 indicating a change has occurred and 0 indicating no change, to indicate when the status of the electrical connectors 30, 50 occurs. The computer system 14 is electrically communicating with each of the sensors 70 for detecting the sensor state, that is, indicating whether a change in status has occurred in the connectors the sensor 70 is attached to. The sensor 70, in one embodiment, may physically cover the connectors 30, 60 such that connecting a device to one of the connectors 30, 60 requires removing or moving the sensor 70, electrically disconnecting the sensor. Removing the sensor 70 triggers the sensor 70, which initiates a signal within the computer system that the sensor 70 state has changed and signifying that the connector 30, 60 status has also changed.

During a power up and a self test of the computer system 14, the computer system 14 using the program 48 checks for new devices by probing the connectors 30, 60 for new hardware. Instead of powering on each connector 30, 60 and probing for a connected device, and in turn, powering on and testing the connected device, the computer system 14 communicates with each sensor 70 for detecting a state change. If a state change has occurred in the sensor, for instance a binary 0 is now a 1 indicating a new device is connected or a device has been removed, the computer systems powers up that connector and probes for any attached devices for power up and self testing.

In the second embodiment of the invention, during a power up and a self test of the computer system 14, if a state change has occurred in the sensor, for instance a binary 0 is now a 1 indicating a new device is connected, the computer systems powers up that connector and one or more attached devices for self testing. If a state change has occurred which indicates a device has been removed, for instance a binary 1 is now a 0, indicating a device is removed from the connector, the program 48 stops probing at that connector since the computer system 14 is now aware that no device is connected. Similarly, when a change of state is not detected at the sensor 70, indicating that either the device was present at the previous start up or no device is present, the program 48 stops probing at that connector since the computer system 14 is now aware that if devices are connected to the connector they were powered up and tested previously or no device exists.

Figure 2:
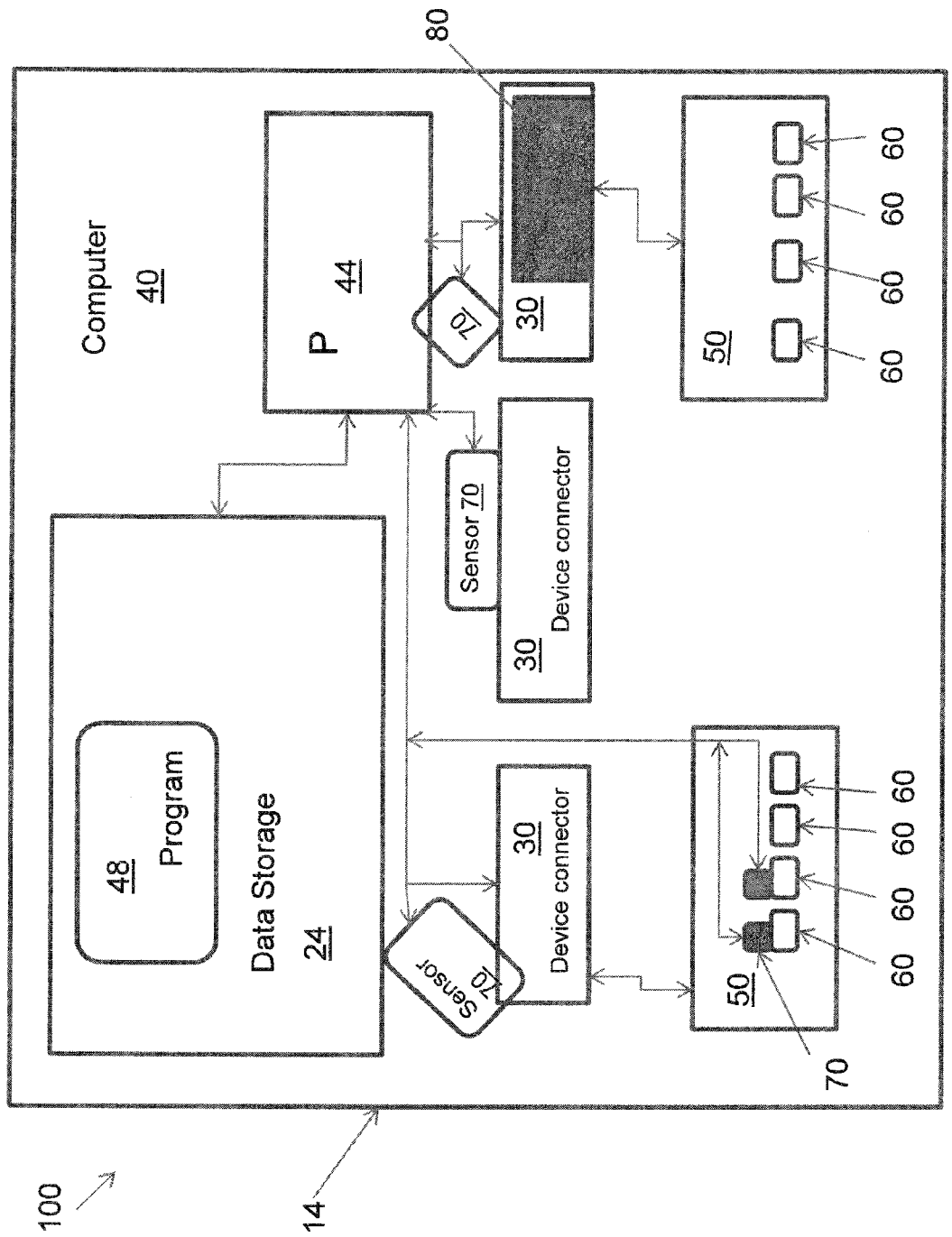
FIG. 2 is a schematic block diagram of another illustrative embodiment of a system for reducing time allocation for configuration testing (e.g., POST) in a self configuring computer system according to another embodiment of the present invention using less sensors.

Referring to FIG. 2, the computer system 14 devices are the same as shown in FIG. 1, however, some of the sensors 70 are removed from the connectors 60 in the device 50. In the computer system 14 configuration shown in FIG. 2, when the sensor 70 connected to the device 30 indicates a change of state, all the connected devices to the device connector 30 without sensors are powered up and tested. Thus, one sensor 70 connected to one connector in a chain of connectors necessitates that all connectors and associated connected devices in the chain are powered up and tested. Particularly, as shown in FIG. 2, device 50 has two of the connectors 60 without sensors 70. Thus, the connectors without sensors 70 are powered up and tested at each start up of the computer system 14, while the other connectors 60 are only powered up, tested and probed for devices when the sensors 70 indicate a state change.

Figure 3:
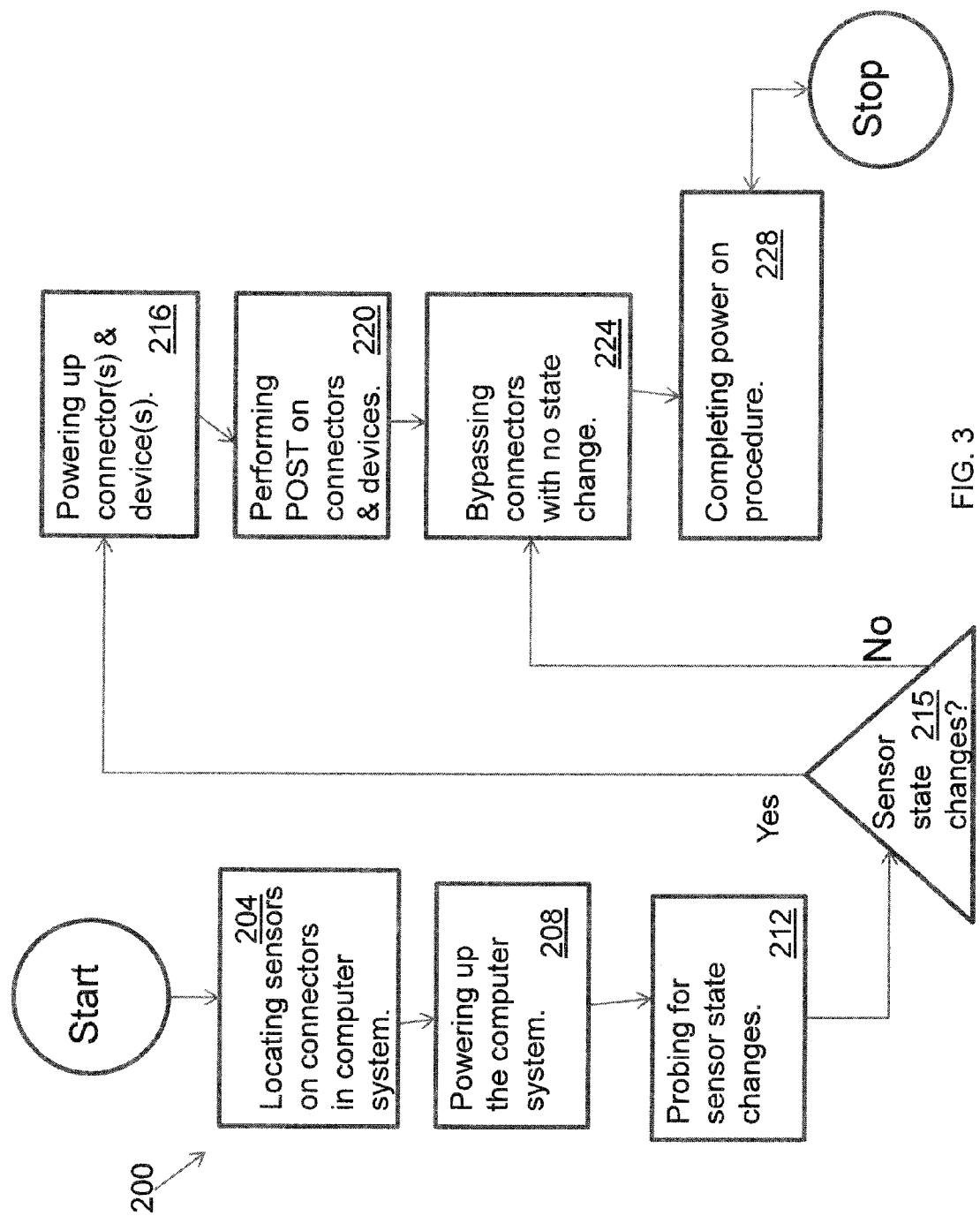
FIG. 3 is a flow chart of an illustrative embodiment of a method for reducing resource allocation for self configuration testing (e.g., POST) in self configuring computer systems as shown in the embodiments of FIGS. 1 and 2, according to the present invention.

Referring to FIG. 3, a method 200 according to the present invention includes locating sensors on connectors 30, 60 in the computer system 14 in step 204 as described above and illustrated in FIGS. 1 and 2. During power up of the computer system 14 in step 208, the computer system 14 probes for sensor state changes in step 212. If there are sensor state changes in step 215, the method 200 continues to step 216, and if there are not sensor state changes in step 215, the method continues to step 224. Step 216 powers up connectors and associated devices when a state change is found at the respective sensor. The method performs a POST on the connectors and associated devices in step 220. The method 200 bypasses connectors and thereby associated devices having no state changes in the respective sensors in step 224, and completes the power on procedure in step 228.

Thereby, in the present invention, the computer system 14 monitors connectors where a power on self test (POST) is conducted by the addition of sensors 70 having switches which detect when changes are made to the physical state of the system, whether the system is on or off. The program 48 of the computer system 14 performs a complete probe of the computer system 14, storing the current known state of all attached devices. The sensors 70 monitor the state of the connectors 30, 60 for possible device changes. When the computer system 14 powers up, the program 48 in the computer system 14 initiates re-probing the connector 30, 60 locations which signal a state change, i.e., having been involved in a status change of the connector 30, 60. The computer system 14 can have a varying degree of granularity for monitoring the connectors and devices, for example, by locating sensors at all connectors or a lesser amount of sensors on selected connectors, for example at the first connector in a chain of connectors, or by having no sensor at all at a connector. In a further example, sensors may be located on connectors which are more likely to be changed, for example, memory slots, locations where devices can be cabled into the system, and expansion slots. In a low cost embodiment of the invention, a single sensor is positioned on a physical case of a device in a computer system. In accordance with the previously discussed embodiments of the invention, the single sensor monitors and indicates when the state of the device is changed, e.g., whether the case has been opened.

While the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. A system for testing a self configuring computer, comprising:
   a computer system including a computer readable medium having a program embodied thereon and a processor for executing the program;
   a plurality of electrical connectors in the computer system for connecting electrical components to the computer system; and
   at least one sensor electrically communicating with an electrical connector in the computer system, the sensor detecting and having a change of state when the electrical connector has a change of status from a previous start up to monitor the electrical connector, the computer system electrically communicating with the sensor for detecting the sensor state, the computer system initiating a power up and a self test of the connector and a new device connected to the connector using the program upon start up of the computer system when a change in the state of the sensor indicates a change in the status of the connector, and the computer system by-passing a power up and self test of the connector when there is no change in the state of the sensor;

wherein the computer system is configured to maintain electrical communication with the connector for determining when the new device is connected to the connector, and only initiate the power up of the connector and the new device when the new device is added.

2. The system of claim 1, wherein a plurality of sensors are positioned on a plurality of respective connectors.

3. The system of claim 1, wherein a plurality of sensors are electrically communicating with respective electrical connectors in the computer system, the sensors detecting when the electrical connector has a change of status and a consistent status from a previous start up, and the sensors indicating a state representative of the status of the electrical connector, the state of the sensors indicating when the change of status and the consistent status of the electrical connector occur, the computer system electrically communicating with the sensors for detecting the state of the sensors, the computer system initiating a power up and a self test of a new device connected to the connector using the program upon start up of the computer system when a change in the state of the sensors indicate a change from no device connected to their respective connectors to the new device connected to their respective connectors, and the computer system by-passes a power up and self test at connectors when the change in the state of their respective sensors indicates no device is connected to the connectors or there is no change in the state of the sensors from the previous start up of the computer system.

4. The system of claim 1, wherein the previous start up is the most recent previous start up.

5. A method for testing a self configuring computer, comprising:
providing a computer system including a computer readable medium having a program embodied thereon and a processor for executing the program;
electrically connecting at least one sensor to at least one electrical connector in the computer system;
powering on the computer system;
detecting a change of state by the sensor from a previous start up using the program to monitor the electrical connector, the sensor change of state indicating a change of status of the connector;
initiating a power up and a self test of the connector and a new device connected to the connector upon detecting a state change of a sensor at a respective connector; and
by-passing a power up and a self test of a connector when there is no change in the state of a respective sensor, wherein the computer system is configured to maintain electrical communication with the connector for determining when the new device is connected to the connector, and only initiate the power up of the connector and the new device when the new device is added.

6. The method of claim 5, wherein a plurality of sensors are connected to a plurality of respective electrical connectors.

7. The method of claim 6, further comprising:
detecting when the electrical connectors have a change of status and a consistent status from a previous start up, and the sensors indicating a state representative of the status of the electrical connector;
indicating, using the state of the sensors, when the change of status and the consistent status of the electrical connectors occur, the computer system electrically communicating with the sensors for detecting the state of the sensors;
initiating a power up and a self test, using the computer system, of a new device connected to the connector using the program upon start up of the computer system when a change in the state of the sensors indicate a change from no device connected to their respective connectors to the new device connected to their respective connectors; and
by-passing a power up and self test at connectors when the change in the state of their respective sensors indicates no device is connected to the connectors or there is no change in the state of the sensors from the previous start up of the computer system.

8. The method of claim 6, wherein the previous start up is the most recent previous start up.

9. A computer program product comprising a computer readable medium having recorded thereon a computer program, a computer system including electrically connected sensors positioned on device connectors and the computer system including a processor for executing the steps of the computer program for generating a power on system test (POST), the program steps comprising:
detecting a change of state by the sensor from a previous start up to monitor the electrical connector, the sensor change of state indicating a change of status of the connector;
initiating a power up and a self test of the connector and a new device connected to the connector upon detecting a state change of a sensor at a respective connector; and
by-passing a power up and a self test of a connector when there is no change in the state of a respective sensor, wherein the computer system is configured to maintain electrical communication with the connector for determining when the new device is connected to the connector, and only initiate the power up of the connector and the new device when the new device is added.

10. The computer program product of claim 9, wherein a plurality of sensors are connected to a plurality of respective electrical connectors.

11. The computer program product of claim 10, further comprising the steps of:
detecting when the electrical connectors have a change of status and a consistent status from a previous start up, and the sensors indicating a state representative of the status of the electrical connector;
indicating, using the state of the sensors, when the change of status and the consistent status of the electrical connectors occur, the computer system electrically communicating with the sensors for detecting the state of the sensors;
initiating a power up and a self test, using the computer system, of a new device connected to the connector using the program upon start up of the computer system when a change in the state of the sensors indicate a change from no device connected to their respective connectors to the new device connected to their respective connectors;
by-passing a power up and self test at connectors when the change in the state of their respective sensors indicates no device is connected to the connectors or there is no change in the state of the sensors from the previous start up of the computer system.

12. The computer program product of claim 9, wherein the previous start up is the most recent previous start up.

13. A computer system, comprising:
- a computer readable medium having a program embodied thereon and a processor for executing the program;
- a plurality of electrical connectors in the computer system for connecting electrical components to the computer system; and
- at least one sensor electrically communicating with an electrical connector in the computer system, the sensor detecting and having a change of state when the electrical connector has a change of status from a previous start up to monitor the electrical connector, the computer system electrically communicating with the sensor for detecting the sensor state, the computer system initiating a power up and a self test of the connector and a new device connected to the connector using the program upon start up of the computer system when a change in the state of the sensor indicates a change in the status of the connector, and the computer system by-passing a power up and self test of the connector when there is no change in the state of the sensor, wherein the computer system is configured to maintain electrical communication with the connector for determining when the new device is connected to the connector, and only initiate the power up of the connector and the new device when the new device is added.

14. The computer system of claim 13, wherein a plurality of sensors are positioned on a plurality of respective connectors.

15. The computer system of claim 14, wherein a plurality of sensors are electrically communicating with respective electrical connectors in the computer system, the sensors detecting when the electrical connector has a change of status and a consistent status from a previous start up, and the sensors indicating a state representative of the status of the electrical connector, the state of the sensors indicating when the change of status and the consistent status of the electrical connector occur, the computer system electrically communicating with the sensors for detecting the state of the sensors, the computer system initiating a power up and a self test of a new device connected to the connector using the program upon start up of the computer system when a change in the state of the sensors indicate a change from no device connected to their respective connectors to the new device connected to their respective connectors, and the computer system by-passes a power up and self test at connectors when the change in the state of their respective sensors indicates no device is connected to the connectors or there is no change in the state of the sensors from the previous start up of the computer system.

16. The computer system of claim 14, wherein the previous start up is the most recent previous start up.

\* \* \* \* \*